United States Patent [19]

Sawaryn

[11] 4,291,454

[45] Sep. 29, 1981

[54] RUBBER BOOT EXPANDER

[75] Inventor: John Sawaryn, Norwich, Conn.

[73] Assignee: The United States of America as represented by the Secretary of the Navy, Washington, D.C.

[21] Appl. No.: 71,886

[22] Filed: Sep. 4, 1979

[51] Int. Cl.$^{3}$ .............................................. B23P 19/04

[52] U.S. Cl. ...................................... 29/426.6; 29/235; 29/446

[58] Field of Search ....................... 29/426.6, 234, 235, 29/236, 450

[56] References Cited

U.S. PATENT DOCUMENTS

| | | | |
|---|---|---|---|
| 2,686,358 | 8/1954 | Hall, Sr. et al. | 29/236 |
| 2,687,566 | 8/1954 | Hall | 29/236 |
| 3,010,194 | 11/1961 | Fratzke | 29/235 |
| 3,786,553 | 1/1974 | Ma | 29/450 X |

*Primary Examiner*—Milton S. Mehr

*Attorney, Agent, or Firm*—Richard S. Sciascia; Arthur A. McGill; Prithvi C. Lall

[57] ABSTRACT

The expander system is utilized for installation and removal of a rubber boot over an underwater transducer. The installation system comprises a vacuum tank, adjusting sleeves, boot spreader and C clamps. The rubber boot is expanded at both ends by means of the boot spreader and then is expanded along its sidewall in a radial direction by means of a differential pressure created by pulling a vacuum on the outside surface of the rubber boot. The boot is then slipped on the transducer. For removal of the boot a short handled hook tool is used in place of the boot spreader. The method again includes pulling a vacuum on the outside surface of the rubber boot so the boot expands enabling the removal of the transducer.

5 Claims, 5 Drawing Figures

RUBBER BOOT EXPANDER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to the underwater transducer art and more particularly to the insertion and removal of a cylindrical transducer with respect to a flexible rubber boot.

In the prior art a round metal disc of a larger diameter than the diameter of a cylindrical transducer is forced into one end of a rubber cylindrical tube or boot as it is commonly called. The disc is secured to the end of the rubber boot with a bonding fastener. An air hose is attached to an aperture at the center of the disc. The other open end of the rubber boot is forced on the top end of the transducer. Three co-workers are stationed around the transducer to force the rubber boot downward manually, while the technician applies air to the disc for expanding the rubber boot.

There are many disadvantages associated with this. It necessitates the employment of three co-workers plus a technician for assembling the rubber boot on the transducer. The procedure is laborious, difficult and time consuming in forcing the rubber boot in place. This procedure also removes a coupling grease from the surface of the transducer. This impairs acoustic performance. It is imperative that the proper amount of coupling grease stays on after the rubber boot is assembled onto the transducer.

The removal of the rubber boot for transducer repair also presents problems. The difficulty of removal at time necessitates the destruction of the rubber boot.

SUMMARY OF THE INVENTION

It is therefore an object of the invention to provide improved means for the insertion and removal of a transducer with respect to a flexible covering. It is an additional object to provide improved apparatus and techniques that makes it easier and less costly than prior art ways to achieve the above results. These and other objects of the invention and the various features and details of construction and operation will become apparent from the specification and drawings.

The covering of the transducer is accomplished in accordance with the present invention by providing a means for radially expanding a cylindrical rubber boot so that it can be slipped over a transducer. The means includes an expander system that has a vacuum tank that enables a vacuum to be pulled on the outside wall of the rubber boot so that atmospheric pressure on the internal wall expands the boot. The system also includes a boot spreader for spreading the ends of the boot prior to pulling the vacuum. The spread ends of the boot are sealed against angled length adjusting sleeves by means of C clamps.

To remove the boot from the transducer the method is somewhat similar to placing the boot on. One difference is that in place of the boot spreader a short handled hook tool is used. The boot is then sealed against the angled length adjusting sleeves by means of C clamps and a vacuum is formed on the exterior radial surface of the rubber boot. This causes the boot to expand radially so that the transducer can be removed from the boot.

DESCRIPTION OF THE PREFERRED EMBODIMENT

Figure 1:
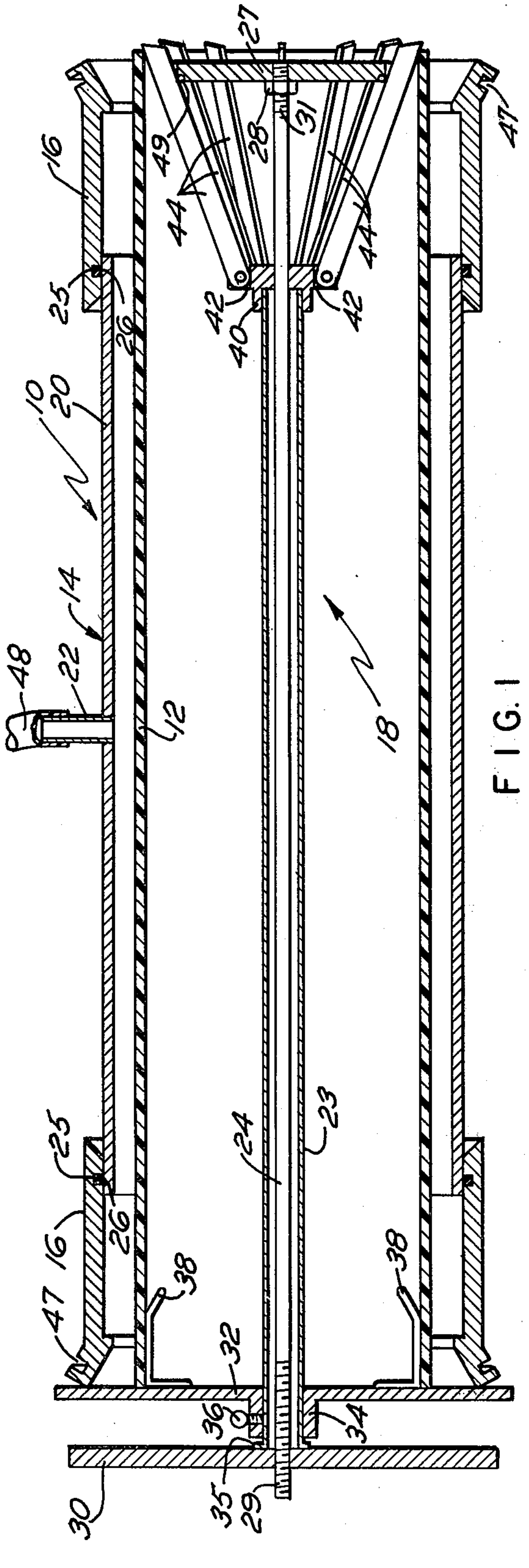
FIG. 1 is a sectional view of the present invention.

Referring now to the figures there is shown an expander system 10 with a rubber boot 12 inserted in place. The expander system 10 includes a vacuum tank 14, angled length adjusting sleeves 16, boot spreader 18 and a quick action C clamp 19.

The vacuum tank 14 comprises a metallic cylinder 20 with an evacuating pipe 22. The adjusting sleeves 16 are placed at each end of the metallic cylinder 20 and are sealed by means of O-rings 25 in grooves 23. The adjusting sleeves 16 are adjusted on the metallic cylinder 20 to the length of the rubber boot 12. The rubber boot 12 is a flexible rubber cylindrical tube that has been inserted into the vacuum tank.

The boot spreader 18 includes a pipe 23 having a rod 24 that is threaded on both ends. At one end 31 the rod 24 is threaded onto disc 27 and held in place by nut 28. The other end 29 of rod 24 is threaded to spreader take-up crank 30 which by rotation moves rod 24 either back or forth within pipe 23. A cross shaped yoke 32 having a collar 34 is located over the end 35 of pipe 23 and affixed to pipe 23 by means of a locking thumb screw 36. The yoke 32 has extension guides 38 for holding boot 12 in place. The other end 39 of pipe 23 has a collar 40 with a plurality of radial extending pieces 42. The pieces 42 are hinged to spreader fingers 44. The extended portions of the spreader fingers 44 are located within slots 46 of disc 27. The spreader fingers 44 ride freely on ball bearings 49 within slots 46 and the movement of disc 26 by means of turning spreader take-up crank 30 determines the radial extension of fingers 44.

Figure 2:
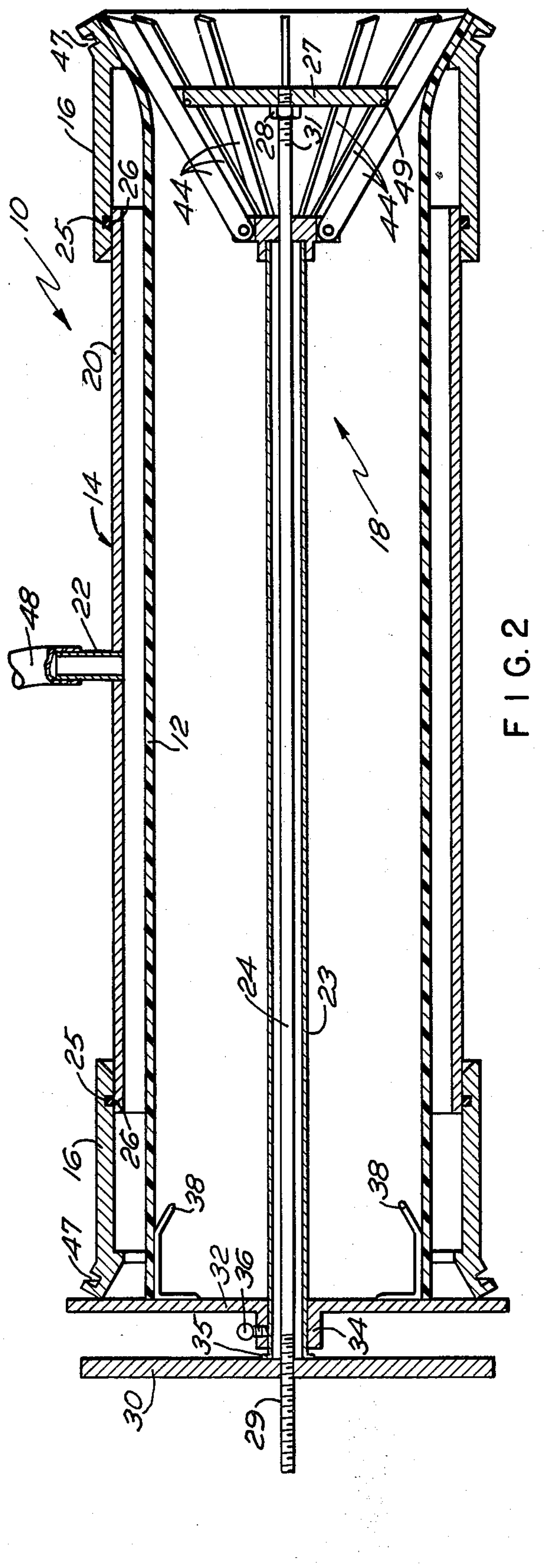
FIG. 2 is the same sectional view shown in FIG. 1 but taken with a number of components in a different position due to certain operations having been performed.
Figure 3:
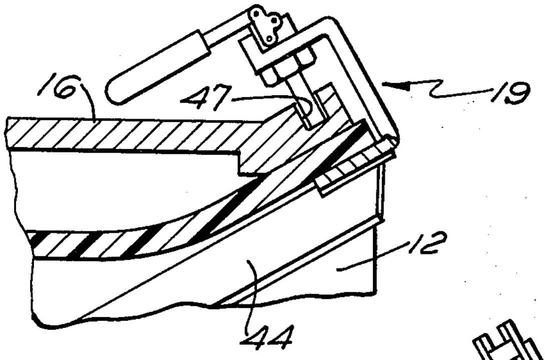
FIG. 3 is a view showing the operation of the C clamp during boot assembly.

In operation the adjusting sleeves 16 are adjusted to the proper length by sliding the sleeves 16 on O-ring 26 in slot 25. The boot spreader 18 is inserted into the rubber boot 12 and adjusted to the proper length of the boot 12. The position of pipe 23 is fixed by tightening locking screw 36. The spreader take-up crank 30 is turned clockwise moving disc 26 until fingers 44 push the rubber boot firm against the angled portion of adjusting sleeve 16 as shown in FIG. 2. The angled portion of adjusting sleeve 16 makes an angle of approximately 35° with the axis of the sleeve 16. Then twelve quick action C clamps 19 are placed between the spreader fingers 44 and clamp the boot 12 to adjusting sleeve 16. The adjusting sleeve 16 has groove 47 on its outer surface for accommodating the C clamps. One end is now secured. Next the boot spreader 18 is removed by turning the spreader take-up crank counterclockwise until loose. The spreading and clamping procedure is then repeated at the other end. This seals both ends. The boot spreader 18 is then removed.

A vacuum pump hose 48 is then connected to evacuating pipe 22 of vacuum tank 14. Evacuation then takes place until the inside diameter of the rubber boot 12 is sufficiently expanded. With the inside diameter expanded, the whole assembly including vacuum tank 14 and rubber boot 12 are placed over the end of transducer 50 and slipped into proper position. The vacuum is released and all quick action C clamps 19 are removed. This completes the rubber boot 12 installation.

Figure 4:
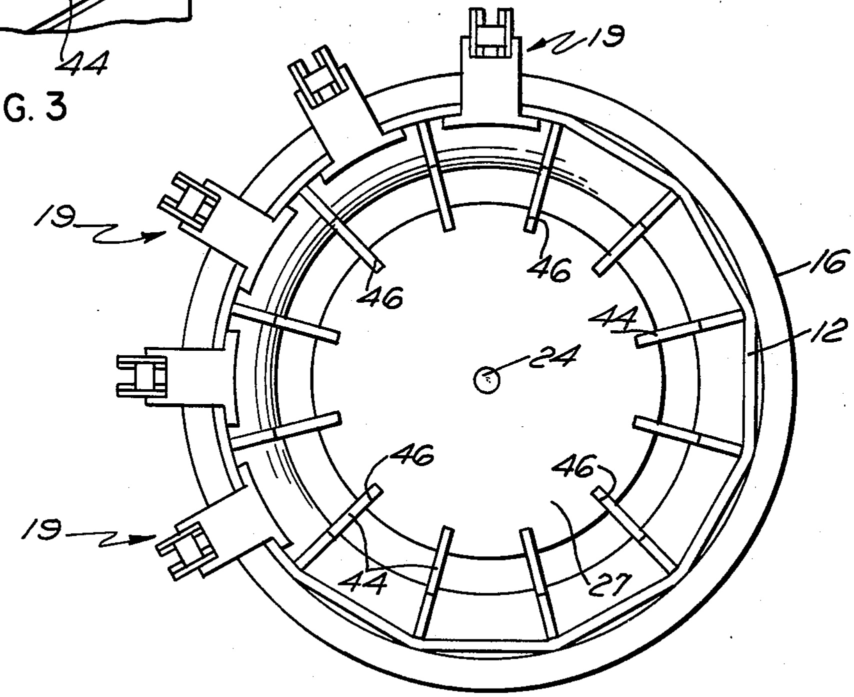
FIG. 4 is an end view during boot assembly.
Figure 5:
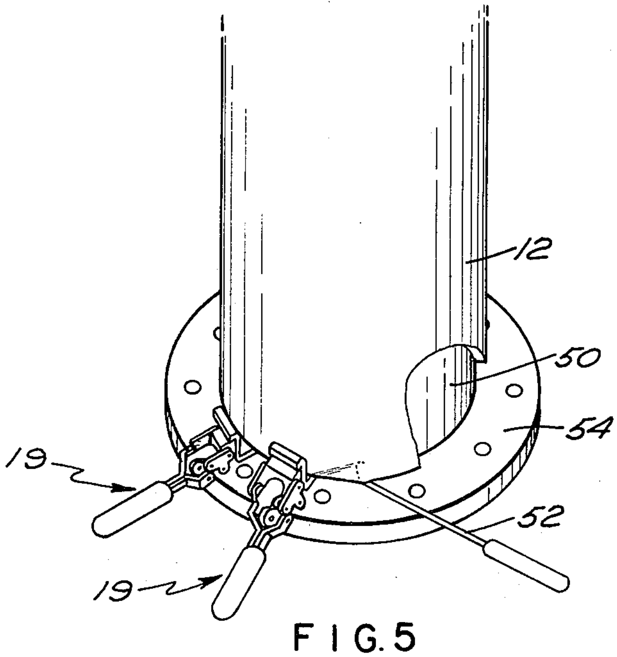
FIG. 5 is a partially cutaway view during boot removal.

For removing rubber boot 12 from transducer 50 the booted transducer is placed on a base 54. A short handled hook tool 52 is placed at the base of the transducer 50 under the end of boot 12 as shown in FIG. 4. The boot 12 is pryed away from the transducer 50 leaving a cavity into which a portion of the quick action C clamps 19 are inserted. Twelve C clamps 19 are inserted around the end of the rubber boot 12 at equal spacing. One of the adjusting angled sleeves 16 is placed over the booted transducer and lowered to the clamps 19. The clamps 19 are assembled on the adjusting angled sleeve 16 and secured. The metallic cylinder 20 of vacuum tank 14 is lowered down to the sleeve 16 and secured.

Then the other adjusting angled sleeve 16 is assembled to metallic cylinder 20 and the tool 52 is applied to the upper portion of transducer 50. The remaining twelve C clamps 19 are then secured. The vacuum hose 48 is connected to evacuating pipe 22 until the rubber boot 12 is free of the transducer 50. Then the rubber boot 12 is removed. The transducer 50 is now ready for repairing.

There has therefore been described a means for controlling accurate and precise installation and removal of a rubber boot on and off of a transducer. This was not previously possible. The technique described prevents removal of the vital coupling grease from the surface of the transducer. The present operation permits one technician to perform a task in a superior manner to what used to take four men to perform.

It will be understood that various changes in details, materials, steps and arrangement of parts, which have been herein described and illustrated in order to explain the nature of the invention, may be made by those skilled in the art within the principle and scope of the invention as expressed in the appended claims.

I claim:

1. A rubber boot expanding mechanism comprising:
- a metallic cylinder with an evacuating pipe;
- adjusting means for providing a hermetically sealed extension to said metallic cylinder, said adjusting means comprises two pieces, each piece having a cylindrical portion adapted to connect to either end of said metallic cylinder, said adjusting means further includes two O-rings with each of said O-rings providing a hermetic seal between said adjusting means pieces and said metallic cylinder;
- a boot spreader adapted to be located axially inside the hollow portion of said metallic cylinder and said adjusting means, said boot spreader having expanding means for expanding radially an end of said rubber boot;
- sealing means for providing a hermetic seal between a radially expanded end of the rubber boot and said end that spreads outward of said adjusting means, said sealing means includes a plurality of C clamps; and
- a yoke connected to said boot spreader, said yoke adapted to hold the end of the rubber boot that is opposite to the expanded end.

2. A rubber boot expanding mechanism according to claim 1 wherein said boot spreader further comprises:
- a pipe having a first and second end, said first end connected to said yoke;

- a rod extending axially within the pipe, said rod is threaded at both ends;
- a spreader take-up crank connected to said rod at one end of said rod for moving said rod back and forth within said pipe;
- a disc connected to said rod at the other end of said rod, said disc having a plurality of slots at the periphery;
- a collar having a plurality of radially extending pieces, said collar connected to said second end of said pipe; and
- a plurality of spreader fingers with each spreader finger connected to one of said radially extending pieces, each of said spreader fingers aligned to slide back and forth within respective members of said disc slots.

3. A method of installing a rubber boot over an underwater transducer comprising the steps of:
- placing a rubber boot inside a metallic cylinder; affixing extensions to the ends of said metallic cylinder;
- placing a boot spreader axially inside said rubber boot, said boot spreader having adjustable fingers for spreading outward and expanding said rubber boot;
- expanding radially a first end of said rubber boot by means of said fingers on said boot spreader;
- clamping said first end of said rubber boot to one of said extensions to provide a hermetic seal;
- removing said boot spreader from inside said rubber boot placing said boot spreader axially inside said rubber boot in the opposite direction to that previously done;
- expanding radially a second end of said rubber boot by means of said fingers on said boot spreader;
- clamping said second end of said rubber boot to another of said extensions to provide a hermetic seal;
- pulling a vacuum on said metallic cylinder;
- placing said transducer inside the inner surface of said rubber boot;
- releasing said vacuum; and
- unclamping said first and second ends of said rubber boot from said extensions.

4. A method of installing a rubber boot over an underwater transducer according to claim 3 further comprising:
- said extensions having grooves; and
- said clamping of the first and second ends of said rubber boot to said extensions is located from between said fingers on the inner surface of said boot to said grooves on said extensions.

5. A method of removing an underwater transducer from a rubber boot comprising the steps of:
- placing a transducer enclosed in a rubber boot inside a metallic cylinder;
- affixing extensions to the ends of said metallic cylinder;
- prying a first end of said rubber boot radially outward with a handled hook tool;
- clamping said first end of said rubber boot to one of said extensions to provide a hermetic seal;
- prying a second end of said rubber boot radially outward with a handled hook tool;
- clamping said second end of said rubber boot to another of said extensions to provide a hermetic seal;
- pulling a vacuum on said metallic cylinder;
- removing said transducer from said rubber boot;
- releasing said vacuum; and
- unclamping said first and second ends of said rubber boot from said extensions.

* * * * *